United States Patent
Nakamura et al.

[19]
[11] Patent Number: 5,878,350
[45] Date of Patent: Mar. 2, 1999

[54] SCHEME FOR CONTROLLING TRANSMISSION POWERS DURING SOFT HANDOVER IN A CDMA MOBILE COMMUNICATION SYSTEM

[75] Inventors: Takehiro Nakamura, Yokosuka; Kouji Ohno, Yokohama; Etsuhiro Nakano, Tokosuka, all of Japan

[73] Assignee: NTT Mobile Communication Network Inc., Tokyo, Japan

[21] Appl. No.: 861,083

[22] Filed: May 21, 1997

[30] Foreign Application Priority Data

May 22, 1996 [JP] Japan ..................................... 8-127383

[51] Int. Cl.[6] .................................................... H04Q 7/00
[52] U.S. Cl. .......................... 455/442; 455/422; 455/437; 455/522; 455/525; 455/575; 370/332; 370/335
[58] Field of Search ........................... 455/422, 436–439, 455/442, 443, 517, 524, 525, 522, 67, 67.1, 69–70, 550, 575, 38.3, 127, 343, 574; 370/331, 332, 318, 335; 375/200, 205

[56] References Cited

U.S. PATENT DOCUMENTS 5,101,501 3/1992 Gilhousen et al. ..................... 455/442
5,267,261 11/1993 Blakeney, II et al. .................. 455/437
5,574,983 11/1996 Douzono et al. ....................... 455/522

FOREIGN PATENT DOCUMENTS

0 671 819 9/1995 European Pat. Off. .
0 680 160 11/1995 European Pat. Off. .
WO 95/08901 3/1995 WIPO .

*Primary Examiner*—Doris H. To
*Attorney, Agent, or Firm*—Oblon, Spivak, McClelland, Maier & Neustadt, P.C.

[57] ABSTRACT

A scheme for controlling transmission powers during a soft handover in a CDMA mobile communication system, in which the receiving quality can always satisfy the reference quality even when a relationship between the receiving qualities at the base stations is reversed within the selective combination interval. In this transmission power control scheme, one radio channel among a plurality of radio channels is selected as a reference radio channel at the prescribed selective combination interval, and then a transmission power control is carried out at a prescribed transmission power control interval so that a receiving quality of the reference radio channel satisfies a prescribed reference quality, while not switching the reference radio channel within the prescribed selective combination interval.

22 Claims, 5 Drawing Sheets

FIG.5

SCHEME FOR CONTROLLING TRANSMISSION POWERS DURING SOFT HANDOVER IN A CDMA MOBILE COMMUNICATION SYSTEM

BACKGROUND OF THE INVENTION

1. Field of the Invention

The present invention relates to a transmission power control scheme for a CDMA (Code Division Multiple Access) mobile communication system, and more particularly, to a scheme for controlling transmission powers during a soft handover in which a mobile station is simultaneously connected with a plurality of base stations in the CDMA mobile communication system, for the purpose of making a receiving quality of a reference radio channel equal to a prescribed receiving quality, 2. Description of the Background Art In order to increase the radio channel capacity (the maximum number of simultaneous communications) in the CDMA mobile communication system, there is a need to control transmission powers so that the receiving qualities of all the radio channels are always set equal to each other.

On the other hand, in the transmission power control during the soft handover in which a mobile station is simultaneously connected with a plurality of base stations, the transmission power can be further reduced by carrying out a transmission power control for setting a receiving quality of a radio channel with the best radio channel quality (which will be referred to as a reference radio channel hereafter) equal to a prescribed reference quality (see Japanese Patent Application No. 7-77934 (1995) for detail).

In the soft handover, a plurality of base stations are connected with a combining station via wire transmission lines, where a plurality of upward transmission signals from these base stations to the combining station are selectively combined at a prescribed selective combination interval at the combining station while a plurality of downward transmission signals from these base stations to the mobile station are selectively combined at a prescribed selective combination interval at the mobile station.

When the above mentioned conventional transmission power control method disclosed in Japanese Patent Application No. 7-77934 is applied to such a soft handover using the selective combination, there arises a problem that the radio channel quality after the selective combination becomes lower than the reference quality.

Namely, from a viewpoint of the radio channel capacity, there is a need to set the transmission power control interval to be an extremely short period of time such as 1 msec, for example. On the other hand, from a viewpoint of the transmission traffic for the reliability information, it is quite difficult to set the selective combination interval equal to the transmission power control interval, and therefore the selective combination interval is set to be longer than the transmission power control interval.

Figure 1:
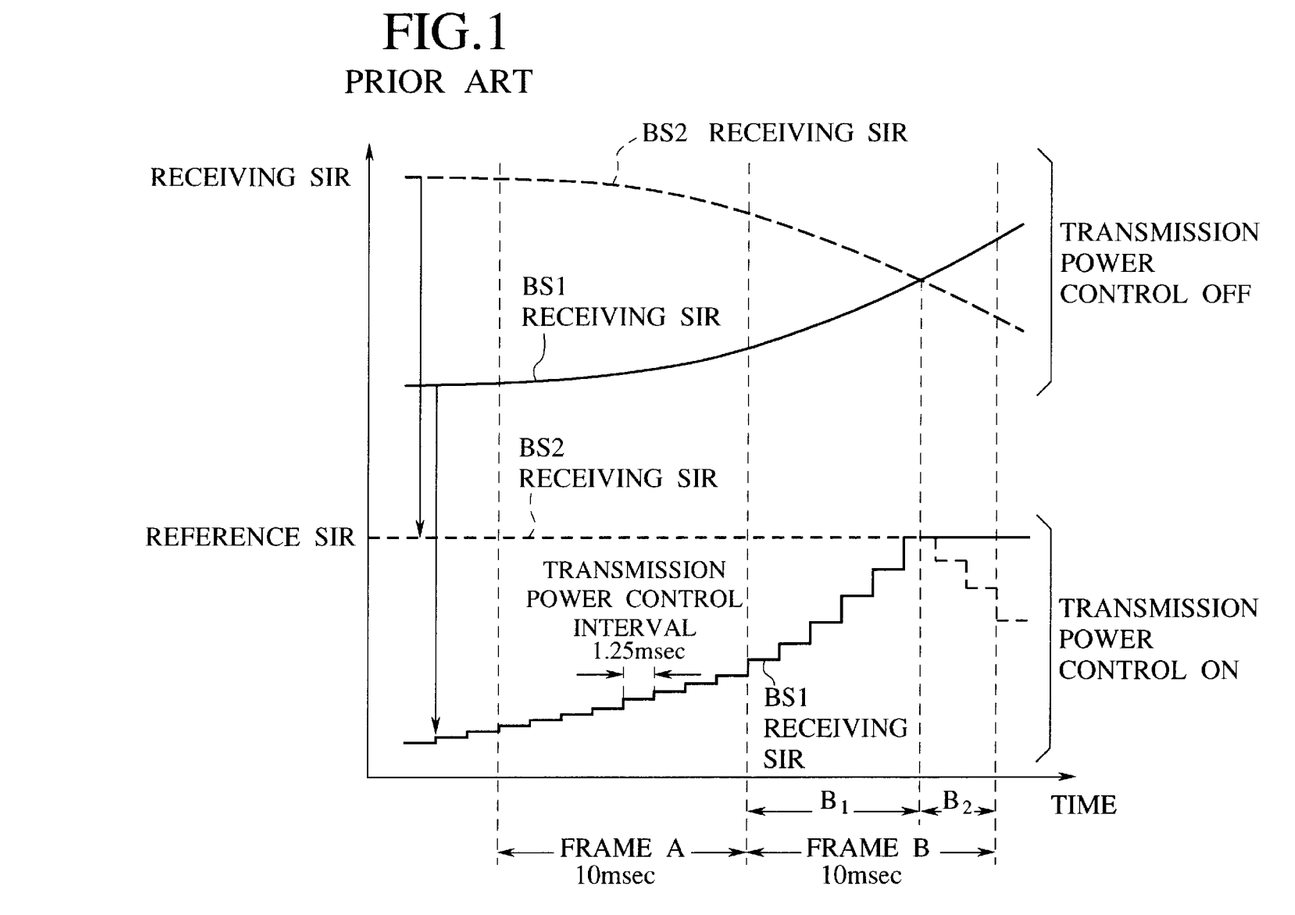
FIG. 1 is a graph showing an exemplary variation in time of a receiving SIR for a case of using a constant maximum transmission power without the transmission power control and for a case of carrying out the conventional transmission power control.

FIG. 1 shows an exemplary variation in time of a receiving SIR (Signal to Interference Ratio), which is a ratio of a desired signal receiving level and an interference receiving level at each base station, for a case of using a constant maximum transmission power without the transmission power control and for a case of carrying out the conventional transmission power control.

As shown in FIG. 1, for a frame A section, when the transmission power control is OFF, the receiving SIR for a base station BS2 as indicated by a dashed line is higher so that a radio channel of this base station BS2 becomes the reference radio channel. Consequently, when the transmission power control is ON, the the receiving SIR of this base station BS2 is controlled to be equal to a reference SIR so that the base station BS2 always satisfies the reference SIR. At the same time, the receiving SIR of a base station BS1 as indicated by a solid line is also controlled to be smaller as much as the receiving SIR of the base station BS2 is made smaller. As should be apparent, at a time of the selective combination for the frame A, the received frame of the base station BS2 will be selected so that the reference SIR can be satisfied even after the selective combination.

In contrast, for a frame B section, in a section $B_1$ up to a middle, the receiving SIR for the base station BS2 as indicated by a dashed line is higher so that the radio channel of the base station BS2 becomes the reference radio channel when the transmission power control is OFF. Consequently, when the transmission power control is ON, and consequently the receiving SIR of the base station BS2 is controlled to be equal to the reference SIR so that the base station BS2 satisfies the reference SIR while the receiving SIR of the base station BS1 is lower than the reference SIR.

Then, the receiving SIR of the base station BS1 becomes higher than that of the base station BS2 in a section B, from a middle. Here, the transmission power control interval is shorter than the frame length so that the radio channel of the base station BS1 becomes the reference radio channel from this middle point on as the receiving SIR of the base station BS1 as indicated by a solid line becomes higher from this middle point on when the transmission power control is OFF. Consequently, when the transmission power control is ON, the receiving SIR of this base station BS1 is controlled to be equal to the reference SIR so that the base station BS1 satisfies the reference SIR while the receiving SIR of the base station BS2 becomes lower than the reference SIR.

In an example shown in FIG. 1, the average SIR in the frame B section is higher for the base station BS2, so that the received frame of the base station BS2 will be selected at a time of the selective combination, but the average receiving SIR of the base station BS2 for the frame B becomes lower than the reference SIR because the receiving SIR of the base station BS2 is degraded in the section B.

Thus, there has been a problem that the communication quality becomes lower than the reference SIR after the selective combination for the frame B.

In other words, when the conventional transmission power control method of Japanese Patent Application No. 7-77934 is applied to the soft handover using the selective combination, there has been a problem that the communication quality after the selective combination cannot satisfy the reference quality at such a selective combination section in which a relationship between the receiving qualities of the base stations is reversed, because the transmission power control interval is shorter than the selective combination interval.

In particular, when the fading frequency is higher, a relationship between the receiving qualities of the base stations will be reversed more frequently within the selective combination interval, and therefore a degradation of the communication quality after the selective combination is expected to be even worse, but such a severe degradation of the communication quality is intolerable from a viewpoint of the service quality.

In addition, for the purpose of the selective combination at the combining station, the data transmission from a plurality of base stations to the combining station via a plurality of wire transmission lines is required, so that there has also been a problem concerning the increase of the wire transmission line traffic, which in turn causes the increase of the wire transmission line cost.

SUMMARY OF THE INVENTION

It is therefore an object of the present invention to provide a scheme for controlling transmission powers during a soft handover in a CDMA mobile communication system, in which the receiving quality can always satisfy the reference quality even when a relationship between the receiving qualities of the base stations is reversed within the selective combination interval.

According to one aspect of the present invention there is provided a method for controlling transmission powers during a soft handover in a CDMA mobile communication system where a mobile station is simultaneously connected with a plurality of base stations via a plurality of radio channels while said plurality of base stations are connected with a combining station via a plurality of wire transmission lines so that a plurality of transmission signals from said plurality of base stations to the combining station are selectively combined at a prescribed selective combination interval by the combining station and a plurality of transmission signals from said plurality of base stations to the mobile station are selectively combined at the prescribed selective combination interval by the mobile station, the method comprising the steps of: selecting one radio channel among said plurality of radio channels as a reference radio channel at the prescribed selective combination interval; and carrying out a transmission power control at a prescribed transmission power control interval so that a receiving quality of the reference radio channel satisfies a prescribed reference quality, while not switching the reference radio channel within the prescribed selective combination interval.

According to another aspect of the present invention there is provided a CDMA mobile communication system comprising a mobile station, a plurality of base stations, and a combining station, where the mobile station during a soft handover is simultaneously connected with a plurality of base stations via a plurality of radio channels while said plurality of base stations are connected with a combining station via a plurality of wire transmission lines so that a plurality of transmission signals from said plurality of base stations to the combining station are selectively combined at a prescribed selective combination interval by the combining station and a plurality of transmission signals from said plurality of base stations to the mobile station are selectively combined at the prescribed selective combination interval by the mobile station, wherein the mobile station includes: a selection unit for selecting one radio channel among said plurality of radio channels as a reference radio channel at the prescribed selective combination interval; and a control unit for carrying out a transmission power control at a prescribed transmission power control interval so that a receiving quality of the reference radio channel satisfies a prescribed reference quality, while not switching the reference radio channel within the prescribed selective combination interval.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 5, the preferred embodiments of the transmission power control scheme according to the present invention will be described in detail.

Figure 2:
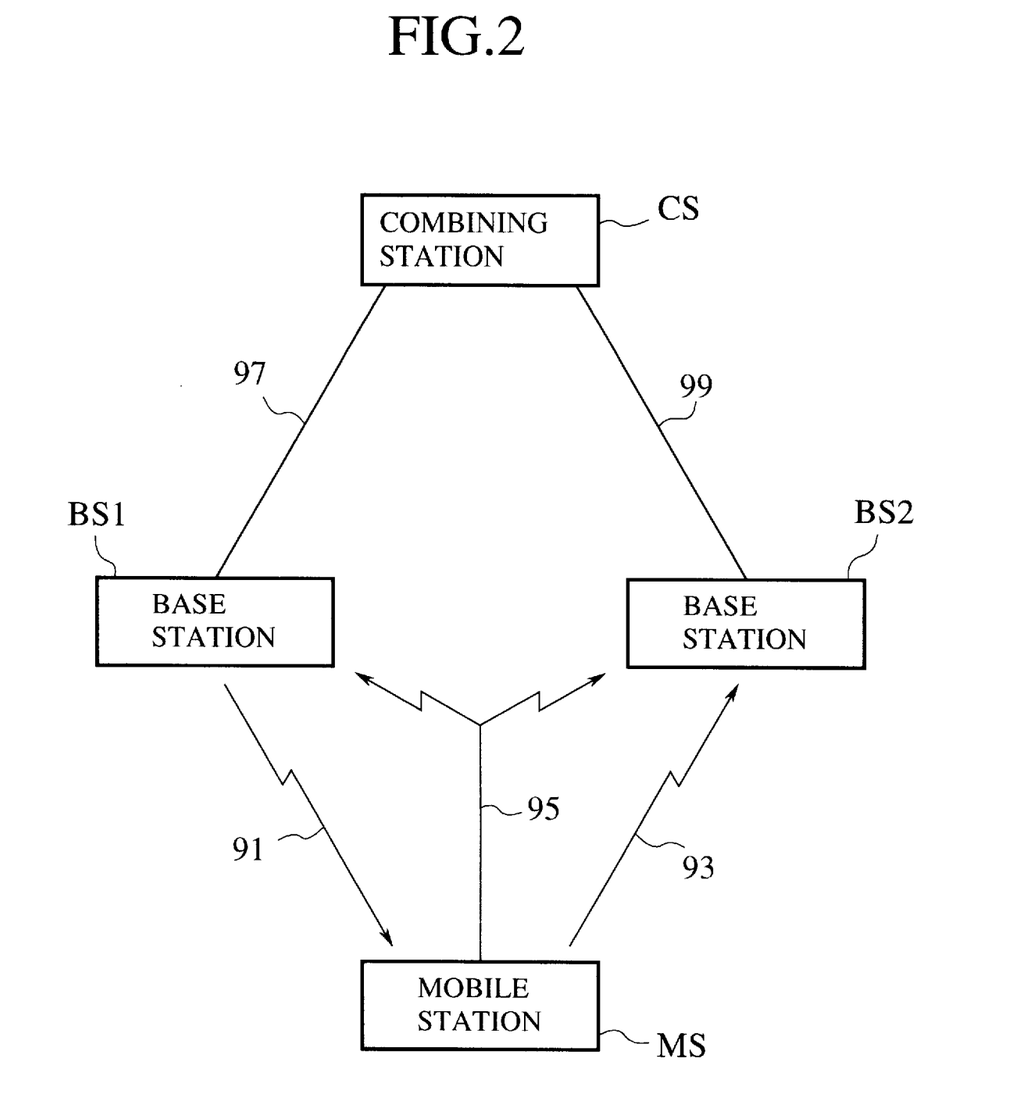
FIG. 2 is a schematic block diagram of an exemplary CDMA mobile communication system for realizing the transmission power control scheme according to the present invention.

FIG. 2 shows a schematic configuration of an exemplary CDMA mobile communication system for realizing the transmission power control scheme according to the present invention, which comprises a mobile station MS, two base stations BS1 and BS2, and a combining station CS.

In this CDMA mobile communication system of FIG. 2, the mobile station MS is in a process of the soft handover and receiving a downlink radio channel 91 from the base station BS1 and a downlink radio channel 93 from the base station BS2 while transmitting a common uplink radio channel 95 to the base stations BS1 and BS2. In addition, the base station BS1 is connected with the combining station CS through a wire transmission line 97 and the base station BS2 is connected with the combining station CS through a wire transmission line 99.

Figure 3:
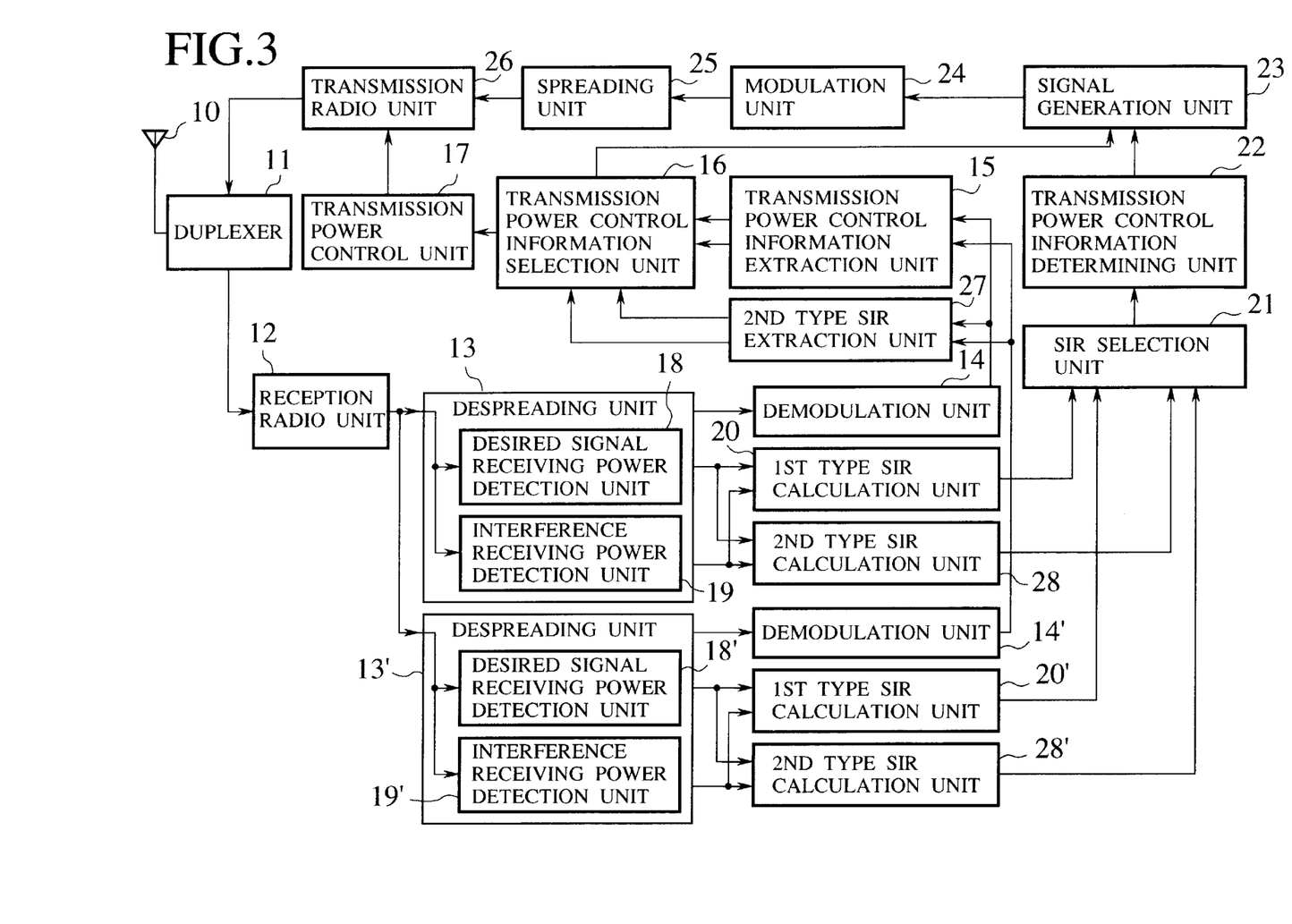
FIG. 3 is a block diagram showing an internal configuration of a mobile station in the CDMA mobile communication system of FIG. 2.

FIG. 3 shows a configuration of the mobile station MS in the CDMA mobile communication system of FIG. 2, which comprises an antenna 10, a duplexer 11, a reception radio unit 12, despreading units 13 and 13', demodulation units 14 and 14', a transmission power control information extraction unit 15, a transmission power control information selection unit 16, a transmission power control unit 17, desired signal receiving power detection units 19 and 19', interference receiving power detection units 20 and 20', a first type SIR calculation unit 20 for calculating an SIR per a transmission power control interval, an SIR selection unit 21, a transmission power control information determining unit 22, a signal generation unit 23, a modulation unit 24, a spreading unit 25, a transmission radio unit 26, a second type SIR extraction unit 27 for extracting an SIR immediately before a unit of selective combination from the received signals, and a second type SIR calculation units 28 and 28' for calculating an SIR immediately before a unit of selective combination. The functions of these elements of the mobile station MS will be described in detail below.

Figure 4:
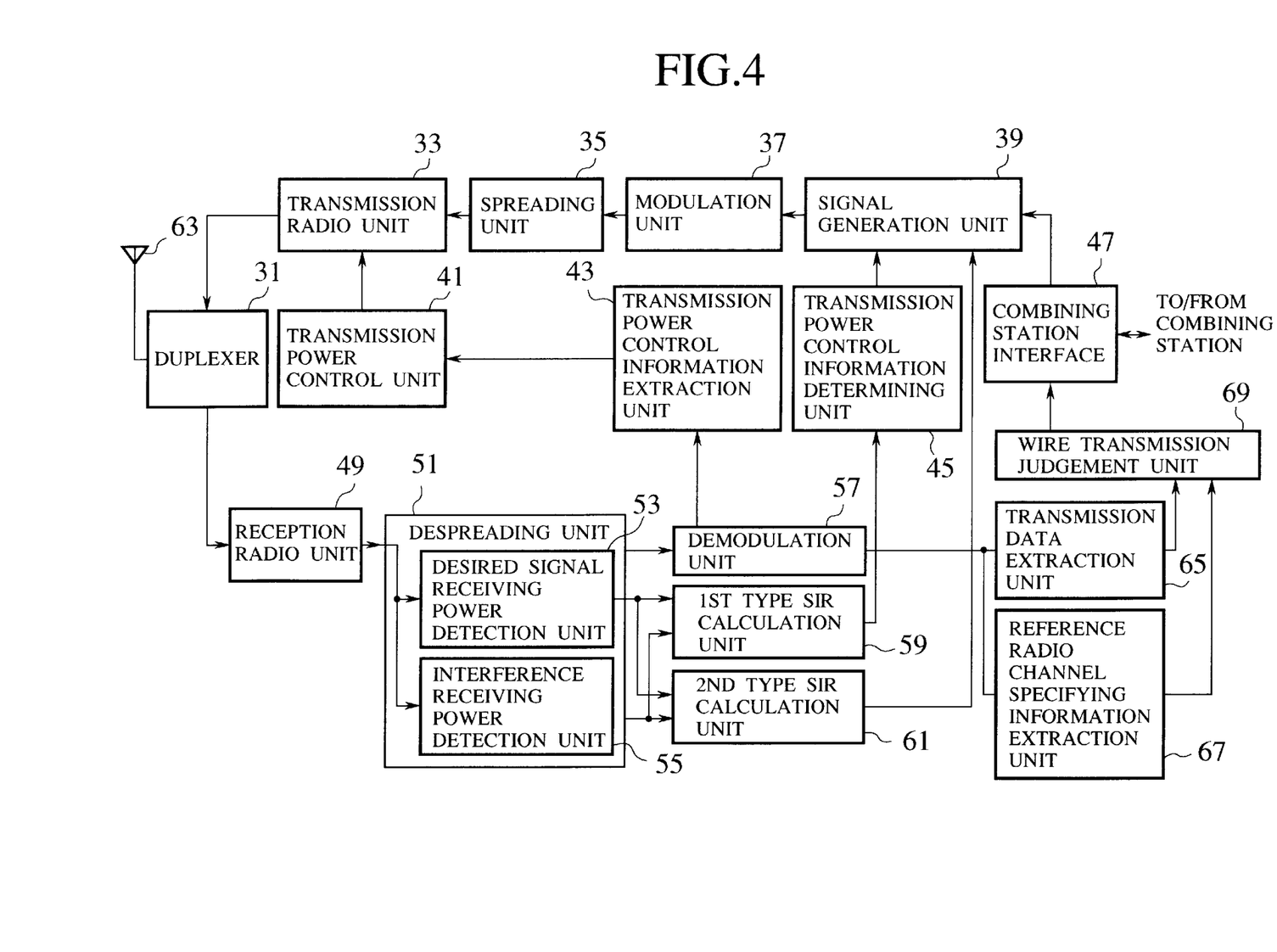
FIG. 4 is a block diagram showing an internal configuration of each base station in the CDMA mobile communication system of FIG. 2.

FIG. 4 shows a configuration of each base station BS (BS1 or BS2) in the CDMA mobile communication system of FIG. 2, which comprises an antenna 63, a duplexer 31, a transmission radio unit 33, a spreading unit 35, a modulation unit 37, a signal generation unit 39, a transmission power control unit 41, a transmission power control information extraction unit 43, a transmission power control information determining unit 45, a combining station interface 47, a reception radio unit 49, a despreading unit 51, a desired signal receiving power detection unit 53, an interference receiving power detection unit 55, a demodulation unit 57, a first type SIR calculation unit 59 for calculating an SIR per a transmission power control interval, a second type SIR calculation unit 61 for calculating an SIR immediately before a unit of selective combination, a transmission data extraction unit 65, a reference radio channel specifying information extraction unit 67, and a wire transmission judgement unit 69. The functions of these elements of the base station BS will be described in detail below.

In the CDMA mobile communication system of FIG. 2, the mobile station MS and the base station BS which are in communication will carry out the transmission power control at a prescribed transmission power control interval so that the receiving qualities of the respective radio channels become equal to a prescribed reference quality. In addition, during the soft handover in which the mobile station MS is simultaneously connected with a plurality (two in this embodiment) of base stations BS1 and BS2 as indicated in FIG. 2, the base stations BS1 and BS2 are connected with the combining station CS through the respective wire transmission lines 97 and 99 so that the transmission signals from the base stations BS1 and BS2 to the combining station CS are selectively combined at the combining station CS at a prescribed selective combination interval, while the transmission signals from the base stations BS1 and BS2 to the mobile station MS are selectively combined at the mobile station MS at a prescribed selective combination interval.

Now, in the first embodiment of the transmission power control scheme according to the present invention, the CDMA mobile communication system of FIG. 2 is operated as follows.

At each one of the base stations BS1 and BS2, the uplink radio channel from the mobile station MS is received by the antenna 63, and the received signals are entered into the reception radio unit 49 through the duplexer 31. These received signals are then subjected to a processing such as a removal of components outside the bandwidth, an amplification, a frequency conversion to an intermediate frequency band, a detection, and an A/D conversion at the reception radio unit 49, and then entered into the despreading unit 51. These received signals are then despread by the despreading unit 51, while the desired signal receiving power and the interference receiving power are measured whenever necessary by the desired signal receiving power detection unit 53 and the interference receiving power detection unit 55, respectively.

These measured desired signal receiving power and interference receiving power are then supplied to the first type SIR calculation unit 59, where the SIR value is calculated at a prescribed timing in each transmission power control interval, and the calculated SIR value is supplied to the transmission power control information determining unit 45.

At the transmission power control information determining unit 45, the entered SIR value is compared with a prescribed reference SIR value. When the entered SIR value is greater than or equal to the prescribed reference SIR value, it is decided that the transmission power control information should be "lower the upward transmission power", whereas when the entered SIR value is less than the prescribed reference SIR value, it is decided that the transmission power control information should be "raise the upward transmission power". This decision is then notified to the signal generation unit 39.

The signal generation unit 39 then generates the transmission power control information to be set to the downlink radio channel according to the decision notified from the transmission power control information determining unit 45, and constructs transmission frames for the downlink radio channel by using the generated transmission power control information and the downward transmission data given from the combining station interface 47.

The transmission frames are then modulated by the modulation unit 37, spread by the spreading unit 35, and subjected to a processing such as a D/A conversion, a frequency conversion and an amplification at the transmission radio unit 33. The transmission frames are then transmitted to the mobile station MS from the antenna 63 through the duplexer 31.

On the other hand, at the mobile station MS in a process of the soft handover which is in communication with a plurality of base stations BS1 and BS2, a plurality of downward signals from the base stations BS1 and BS2 are collectively received by the antenna 10, and entered into the reception radio unit 12 through the duplexer 11. These collectively entered plurality of downward signals are then subjected to a processing such as a removal of components outside the bandwidth, an amplification, a frequency conversion to an intermediate frequency band, a detection, and an A/D conversion at the reception radio unit 12. These downward signals for two radio channels are then distributed to the despreading units 13 and 13'.

These downward signals from two base stations BS1 and BS2 are then separately despread by using the respective spread codes at the despreading units 13 and 13', and the despread signals for two radio channels are then entered into the demodulation units 14 and 14' respectively. The demodulation units 14 and 14' demodulate the respective despread signals for the respective radio channels, and supply these demodulated signals for two radio channels to the transmission power control information extraction unit 15. The transmission power control information extraction unit 15 then extracts two transmission power control informations from the supplied demodulated signals for two radio channels, and supplies these two extracted transmission power control informations to the transmission power control information selection unit 16.

The transmission power control information selection unit 16 selects one transmission power control information which is continually commanding the lowering of the transmission power for the longest period of time prior to the transmission power control information immediately before the current unit of selective combination among these two entered transmission power control informations. Then, only the transmission power control received from one base station which transmitted that selected transmission power control information is supplied to the transmission power control unit 17 during the current unit of selective combination. This processing is carried out at every selective combination interval.

The transmission power control unit 17 determines the transmission power value at the transmission power control interval so as to raise or lower the transmission power by a prescribed value according to the entered transmission power control information, and notifies the determined transmission power value to the transmission radio unit 26. At the transmission radio unit 26, the upward transmission signals given from the spreading unit 25 are subjected to a processing such as a D/A conversion, a frequency conversion, and an amplification according to the transmission power value notified from the transmission power control unit 17, and then transmitted to the base stations BS1 and BS2 from the antenna 10 through the duplexer 11.

In this first embodiment, the radio channel which is continually commanding the lowering of the transmission power for the longest period of time prior to the transmission power control information immediately before the current unit of selective combination is set as the reference radio channel for the current unit of selective combination. Namely, the mobile station in a process of the soft handover sets the radio channel which has the best receiving quality immediately before each unit of selective combination among a plurality of radio channels as the reference radio channel for each unit of selective combination and carries out the transmission power control so that the receiving SIR of this reference radio channel becomes equal to the prescribed reference SIR.

Figure 5:
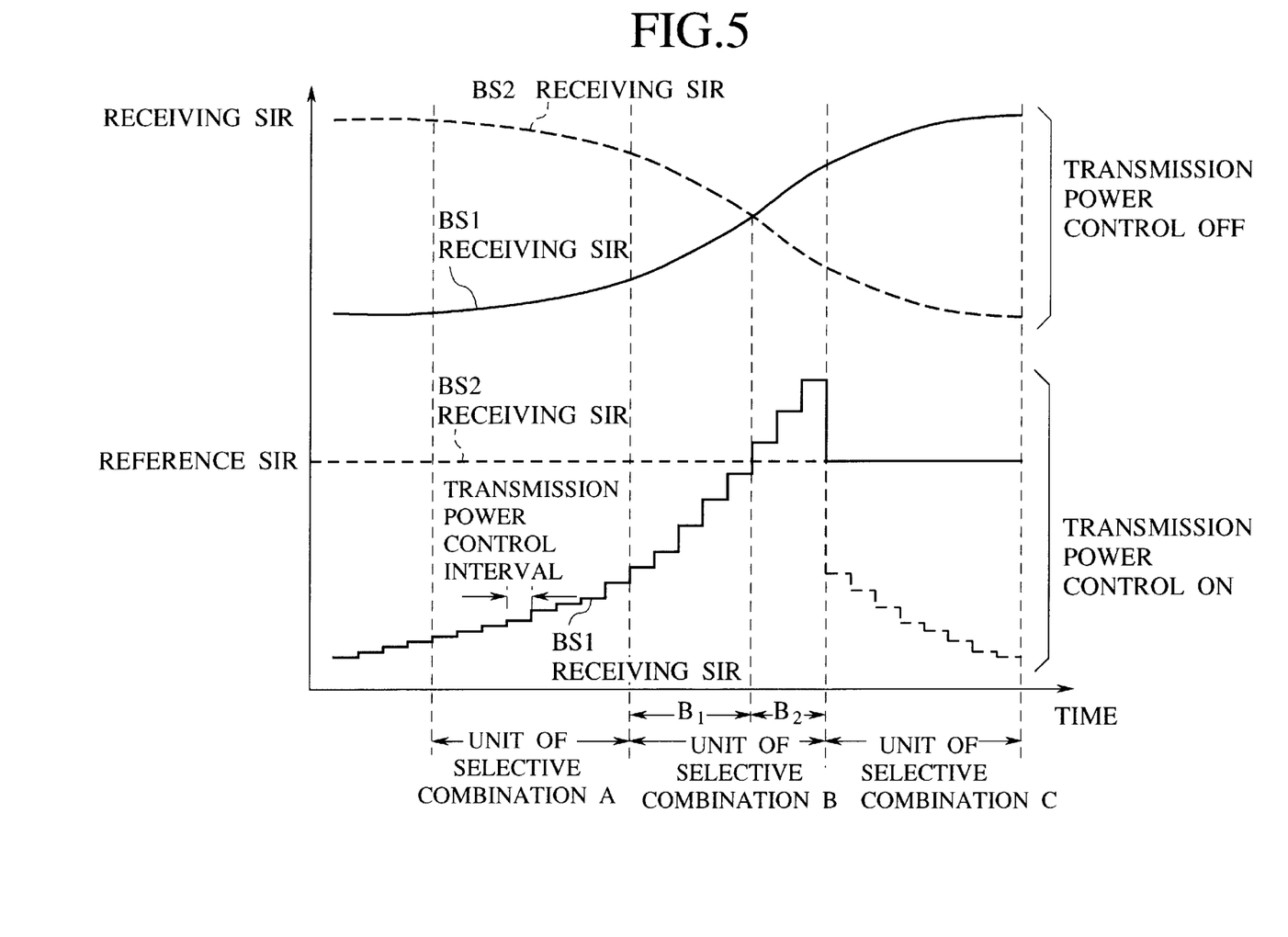
FIG. 5 is a graph showing an exemplary variation in time of a receiving SIR for a case of using a constant maximum transmission power without the transmission power control and for a case of carrying out the transmission power control according to the present invention.

In an exemplary case shown in FIG. 5, for a unit of selective combination B, the radio channel of the base station BS2 which has the best receiving SIR immediately before this unit of selective combination B is set as the reference radio channel, and even when the receiving SIR of the base station BS1 becomes better than that of the base station BS2 during this unit of selective combination B as indicated in FIG. 5, the reference radio channel is not switched within this unit of selective combination B, so that the prescribed reference quality can be satisfied by the reference radio channel within the unit of selective combination.

Note here that, in an exemplary case shown in FIG. 5, the receiving SIR of the base station BS1 slightly exceeds the reference SIR at the section $B_2$ of the unit of selective combination B and this causes the interference so that the capacity is slightly reduced, but this reduction of the capacity is so slight that it hardly causes any practical problem.

Next, in the second embodiment of the transmission power control scheme according to the present invention, the CDMA mobile communication system of FIG. 2 is operated as follows.

In this second embodiment, the mobile station MS is in a process of the soft handover where the mobile station MS is simultaneously connected with two base stations BS1 and BS2, a plurality of downward signals from the base stations BS1 and BS2 are collectively received by the antenna 10, and entered into the reception radio unit 12 through the duplexer 11. These collectively entered plurality of downward signals are then subjected to a processing such as a removal of components outside the bandwidth, an amplification, a frequency conversion to an intermediate frequency band, a detection, and an A/D conversion at the reception radio unit 12. These downward signals for two radio channels are then distributed to the despreading units 13 and 13', and separately despread by using the respective spread codes at the despreading units 13 and 13'.

In addition, at the despreading units 13 and 13', the desired signal receiving power and the interference receiving power of the received signals for each radio channel are measured whenever necessary by the desired signal receiving power detection units 18 and 18' and the interference receiving power detection units 19 and 19' respectively, and the measured receiving power values for each radio channel are supplied to the first type SIR calculation units 20 and 20' and the second type SIR calculation units 28 and 28' respectively. The first type SIR calculation units 20 and 20' respectively calculate the SIR values for respective radio channels at a prescribed timing in each transmission power control interval according to the measured receiving power values and supply the calculated SIR values for two radio channels to the SIR selection unit 21. The second type SIR calculation units 28 and 28' respectively calculate the SIR values for respective radio channels immediately before a unit of selective combination according to the measured receiving power values and supply the calculated SIR values for two radio channels to the SIR selection unit 21.

The SIR selection unit 21 selects the downlink radio channel with the best receiving SIR immediately before a unit of selective combination among those supplied from the second type SIR calculation units 28 and 28' as the reference radio channel for the current unit of selective combination, while selecting the SIR value supplied from one of the first type SIR calculation units 20 and 20' corresponding to the reference radio channel for the current unit of selective combination, and supplying the selected SIR value to the transmission power control information determining unit 22. In this case, the SIR value supplied from the other one of the first type SIR calculation units 20 and 20' corresponding to the other radio channel which is not the reference radio channel for the current unit of selective combination will be discarded at the SIR selection unit 21. This processing is carried out at every selective combination interval.

At the transmission power control information determining unit 22, the entered SIR value is compared with a prescribed reference SIR value. When the entered SIR value is greater than or equal to the prescribed reference SIR value, it is decided that the transmission power control information should be "lower the downward transmission power", whereas when the entered SIR value is less than the prescribed reference SIR value, it is decided that the transmission power control information should be "raise the downward transmission power". This decision is then notified to the signal generation unit 23.

The signal generation unit 23 then generates the transmission power control information to be set to the uplink radio channel according to the decision notified from the transmission power control information determining unit 22, and constructs transmission frames for the uplink radio channel by using the generated transmission power control information.

The transmission frames are then modulated by the modulation unit 24, spread by the spreading unit 25, and subjected to a processing such as a D/A conversion, a frequency conversion and an amplification at the transmission radio unit 26. The transmission frames are then transmitted to a plurality of base stations BS1 and BS2 from the antenna 10 through the duplexer 11.

On the other hand, at each base station BS, the upward signal from the mobile station MS is received by the antenna 63, and entered into the reception radio unit 49 through the duplexer 31. The received upward signal is then subjected to a processing such as a removal of components outside the bandwidth, an amplification, a frequency conversion to an intermediate frequency band, a detection, and an A/D conversion at the reception radio unit 49, and then entered into the despreading unit 51.

The despreading unit 51 despreads the received upward signal and supplies the despread signal into the demodulation unit 57. The demodulation unit 57 demodulates the despread signal and supplies the demodulated signal into the transmission power control information extraction unit 43 and the combining station interface 47. The combining station interface 47 then transmits the user data to the combining station CS through a wire transmission line 97 or 99.

The transmission power control information extraction unit 43 extracts the transmission power control information from the demodulated signal supplied by the demodulation unit 57 at each transmission power control interval, and supplies the extracted transmission power control information to the transmission power control unit 41. The transmission power control unit 41 determines the transmission power value at the transmission power control interval so as to raise or lower the transmission power by a prescribed value according to the entered transmission power control information, and notifies the determined transmission power value to the transmission radio unit 33.

At the transmission radio unit 33, the downward transmission signals given from the spreading unit 35 are subjected to a processing such as a D/A conversion, a frequency conversion, and an amplification according to the transmission power value notified from the transmission power control unit 41, and then transmitted to the mobile station MS from the antenna 63 through the duplexer 31.

Next, in the third embodiment of the transmission power control scheme according to the present invention, the CDMA mobile communication system of FIG. 2 is operated as follows.

In this third embodiment, during the soft handover in which the mobile station MS is simultaneously connected with a plurality of base stations BS1 and BS2, each base station BS receives the uplink radio channel from the mobile station MS at the antenna 63, and the received signals are entered into the reception radio unit 49 through the duplexer 31. These received signals are then subjected to a processing such as a removal of components outside the bandwidth, an amplification, a frequency conversion to an intermediate frequency band, a detection, and an A/D conversion at the reception radio unit 49, and then entered into the despreading unit 51. These received signals are then despread by the despreading unit 51, while the desired signal receiving power and the interference receiving power are measured whenever necessary by the desired signal receiving power detection unit 53 and the interference receiving power detection unit 55, respectively.

These measured desired signal receiving power and interference receiving power are then supplied to the first type SIR calculation unit 59 and the second type SIR calculation unit 63. The first type SIR calculation unit 59 calculates the SIR value at a prescribed timing in each transmission power control interval according to the measured receiving power values and supplies the calculated SIR value to the transmission power control information determining unit 45. The second type SIR calculation unit 63 calculates the SIR value immediately before a unit of selective combination according to the measured receiving power values and supply the calculated SIR value to the signal generation unit 39.

At the transmission power control information determining unit 45, the entered SIR value is compared with a prescribed reference SIR value. When the entered SIR value is greater than or equal to the prescribed reference SIR value, it is decided that the transmission power control information should be "lower the upward transmission power", whereas when the entered SIR value is less than the prescribed reference SIR value, it is decided that the transmission power control information should be "raise the upward transmission power". This decision is then notified to the signal generation unit 39.

The signal generation unit 39 then generates the transmission power control information to be set to the downlink radio channel according to the decision notified from the transmission power control information determining unit 45, and constructs transmission frames for the downlink radio channel by using the generated transmission power control information, the downward transmission data given from the combining station interface 47, and the SIR value supplied from the second type SIR calculation unit 61.

The transmission frames are then modulated by the modulation unit 37, spread by the spreading unit 35, and subjected to a processing such as a D/A conversion, a frequency conversion and an amplification at the transmission radio unit 33. The transmission frames are then transmitted to the mobile station MS from the antenna 63 through the duplexer 31.

On the other hand, at the mobile station MS, a plurality of downward signals from the base stations BS1 and BS2 are collectively received by the antenna 10, and entered into the reception radio unit 12 through the duplexer 11. These collectively entered plurality of downward signals are then subjected to a processing such as a removal of components outside the bandwidth, an amplification, a frequency conversion to an intermediate frequency band, a detection, and an A/D conversion at the reception radio unit 12. These downward signals for two radio channels are then distributed to the despreading units 13 and 13'.

These downward signals from two base stations BS1 and BS2 are then separately despread by using the respective spread codes at the despreading units 13 and 13', and the despread signals for two radio channels are then entered into the demodulation units 14 and 14' respectively. The demodulation units 14 and 14' demodulate the respective despread signals for the respective radio channels, and supply these demodulated signals for two radio channels to the transmission power control information extraction unit 15 and the second type SIR extraction unit 27.

The transmission power control information extraction unit 15 then extracts two transmission power control informations from the supplied demodulated signals for two radio channels at each transmission power control interval, and supplies these two extracted transmission power control informations to the transmission power control information selection unit 16. The second type SIR extraction unit 27 extracts two SIR values immediately before a unit of selective combination measured by the base stations from the supplied demodulated signals for two radio channels at each selective combination interval, and supplies these two SIR values to the transmission power control information selection unit 16.

The transmission power control information selection unit 16 selects the uplink radio channel with the best SIR immediately before a unit of selective combination among those supplied from the second type SIR extraction unit 27 as the reference radio channel for the current unit of selective combination, while selecting the transmission power control information supplied from the transmission power control information extraction unit 15 which is corresponding to the reference radio channel for the current unit of selective combination, and supplying the selected transmission power control information to the transmission power control unit 17. In this case, the transmission power control information corresponding to the other radio channel which is not the reference radio channel for the current unit of selective combination will be discarded at the transmission power control information selection unit 15. This processing is carried out at every selective combination interval.

The transmission power control unit 17 determines the transmission power value at the transmission power control interval so as to raise or lower the transmission power by a prescribed value according to the transmission power control information supplied from the transmission power control information selection unit 16, and notifies the determined transmission power value to the transmission radio unit 26. At the transmission radio unit 26, the upward transmission signals given from the spreading unit 25 are subjected to a processing such as a D/A conversion, a frequency conversion, and an amplification according to the transmission power value notified from the transmission power control unit 17, and then transmitted to the base stations BS1 and BS2 from the antenna 10 through the duplexer 11.

Next, in the fourth embodiment of the transmission power control scheme according to the present invention, the CDMA mobile communication system of FIG. 2 is operated as follows.

In this fourth embodiment, when the reference radio channel is determined for each unit of selective combination by the transmission power control information selection unit 16 of the mobile station MS, a reference radio channel specifying information which is specifying this determined reference radio channel for each unit of selective combination is supplied to the signal generation unit 23. At the signal generation unit 23, this reference radio channel specifying information is included into the transmission signals which includes the transmission power control information supplied from the transmission power control information determining unit 22, and the transmission signals are supplied to the modulation unit 24. These transmission signals containing the reference radio channel specifying information are then demodulated by the demodulation unit 24, spread by the spreading unit 25, and transmitted to the base stations BS1 and BS2 through the transmission radio unit 26, the duplexer 11 and the antenna 10.

On the other hand, each base station BS receives the transmission signals from the mobile station MS at the antenna 63, and the received signals are entered into the reception radio unit 49 through the duplexer 31. These received signals are then despread by the despreading unit 51, and demodulated by the demodulation unit 57. From these demodulated signals, the transmission data and the reference radio channel specifying information are separately extracted at each unit of selective combination by the transmission data extraction unit 65 and the reference radio channel specifying information extraction unit 67, and supplied to the wire transmission judgement unit 69.

The wire transmission judgement unit 69 then judges whether the reference radio channel specifying information in the current unit of selective combination indicates a radio channel of the own station or not, and when it indicates a radio channel of the own station, transmits the transmission data contained in the current unit of selective combination to the combining station CS through the combining station interface 47 and the wire transmission line 97 or 99.

Also, at the wire transmission judgement unit 69, when the reference radio channel specifying information supplied from the reference radio channel specifying information extraction unit 67 does not indicate a radio channel of the own station, or a state in which it does not indicate a radio channel of the own station is consecutively encountered for a prescribed number of times, the transmission data contained in the current unit of selective combination are not transmitted through the wire transmission line 97 or 99.

Using this configuration in which the base station does not transmits the transmission data through the wire transmission line when the reference radio channel specifying information does not indicate a radio channel of the own station or a state in which it does not indicate a radio channel of the own station is consecutively encountered for a prescribed number of times, it becomes possible to reduce the wire transmission line traffic. In other words, it becomes possible to realize the same level of the wire transmission line traffic as in a case of not carrying out the maximum soft handover.

As described, according to the present invention, one radio channel is set as the reference radio channel among a plurality of radio channels, and the transmission power control is carried out so that the receiving quality of the reference radio channel becomes the prescribed reference quality, while this reference radio channel is not switched within the selective combination interval. Consequently, even in the selective combination interval in which a relationship between the receiving qualities of the base stations is reversed, it is possible for the reference radio channel to always satisfy the prescribed reference quality within the selective combination interval.

Note here that the present invention can be applied to the uplink radio channels alone, the downlink radio channels alone, or both of them simultaneously, by setting the reference radio channel among uplink radio channels alone or among downlink radio channels alone, or else by setting one reference radio channel among uplink radio channels while setting another reference radio channel among downlink radio channels separately.

Also, according to the present invention, the radio channel which has the best receiving quality immediately before each unit of selective combination among a plurality of radio channels is set as the reference radio channel, and the transmission power control is carried out so that the receiving quality of the reference radio channel becomes the prescribed reference quality. Consequently, it is possible for the reference radio channel to always satisfy the prescribed reference quality within the selective combination interval.

Also, according to the present invention, the mobile station during the soft handover sets the radio channel which is continually commanding the lowering of the transmission power for the longest period of time prior to the transmission power control information immediately before the current unit of selective combination as the reference radio channel for the current unit of selective combination, and this reference radio channel is not switched within the selective combination interval. Consequently, it is possible for the reference radio channel to always satisfy the prescribed reference quality within the selective combination interval.

Also, according to the present invention, the receiving quality is measured immediately before each unit of selective combination at the receiving side, and an information on the measured receiving quality, i.e., the measured receiving quality itself or an information indicative of the measured receiving quality, is transmitted to the transmitting side alongside the transmission power control information. Then, the transmitting side judges which radio channel is the best according to the information on the measured receiving quality, sets the radio channel that is judged the best as the reference radio channel, and this reference radio channel is not switched within the selective combination interval. Consequently, it is possible for the reference radio channel to always satisfy the prescribed reference quality within the selective combination interval.

In addition, according to the present invention, an information for specifying which radio channel is the reference radio channel is included at each unit of selective combination in the uplink radio channel transmitted from the mobile station. Then, at each base station, when the received reference radio channel specifying information in the current unit of selective combination indicates a radio channel of the own station, the transmission data contained within the current unit of selective combination are transmitted to the combining station via the wire transmission line, whereas when the received reference radio channel specifying information does not indicates a radio channel of the own station or when a state in which it does not indicate a radio channel of the own station is consecutively encountered for a prescribed number of times, the transmission data contained within the current unit of selective combination are not transmitted to the combining station via the wire transmission line. Consequently, it becomes possible to reduced the wire transmission traffic to the same level as that in a case of not carrying out the maximum soft handover.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for controlling transmission powers during a soft handover in a CDMA mobile communication system where a mobile station is simultaneously connected with a plurality of base stations via a plurality of radio channels while said plurality of base stations are connected with a combining station via a plurality of wire transmission lines so that a plurality of transmission signals from said plurality of base stations to the combining station are selectively combined at a prescribed selective combination interval by the combining station and a plurality of transmission signals from said plurality of base stations to the mobile station are selectively combined at the prescribed selective combination interval by the mobile station, the method comprising the steps of:

selecting one radio channel among said plurality of radio channels as a reference radio channel at the prescribed selective combination interval; and carrying out a transmission power control at a prescribed transmission power control interval so that a receiving quality of the reference radio channel satisfies a prescribed reference quality, while not switching the reference radio channel within the prescribed selective combination interval.

2. The method of claim 1, wherein the selecting step selects a radio channel which has a best receiving quality immediately before each unit of selective combination as the reference radio channel for said each unit of selective combination.

3. The method of claim 1, wherein the selecting step selects said one radio channel from a plurality of uplink radio channels.

4. The method of claim 3, further comprising the steps of:

judging at each base station whether a receiving quality of a received uplink radio channel satisfies the prescribed reference quality or not at the prescribed transmission power control interval; and transmitting from each base station through a downlink radio channel a transmission power control information at the prescribed transmission power control interval, wherein the transmission power control information commands a lowering of an upward transmission power when the receiving quality of the received uplink radio channel is judged as satisfying the prescribed reference quality or a raising of the upward transmission power when the receiving quality of the received uplink radio channel is judged as not satisfying the prescribed reference quality;

and wherein at the selecting step, the mobile station receives a plurality of transmission power control informations from said plurality of base stations, and selects an uplink radio channel received by one base station that is transmitting the transmission power control information which is continually commanding a lowering of the upward transmission power for a longest period of time prior to the transmission power control information immediately before a current unit of selective combination as the reference radio channel for the current unit of selective combination; and at the carrying out step, the mobile station carries out the transmission power control during the current unit of selective combination by lowering or raising the upward transmission power at the prescribed transmission power control interval according to the transmission power control information transmitted from said one base station that is receiving the reference radio channel for the current unit of selective combination.

5. The method of claim 3, further comprising the steps of:

measuring at each base station a receiving quality of a received uplink radio channel immediately before each unit of selective combination; and transmitting from each base station to the mobile station a transmission power control information and an information on a measured receiving quality;

and wherein at the selecting step, the mobile station selects an uplink radio channel which has a best receiving quality according to said information on a measured receiving quality for a plurality of uplink radio channels as the reference radio channel for a current unit of selective combination; and at the carrying out step, the mobile station carries out the transmission power control during the current unit of selective combination by lowering or raising the upward transmission power at the prescribed transmission power control interval according to the transmission power control information transmitted from one base station that is receiving the reference radio channel for the current unit of selective combination.

6. The method of claim 1, wherein the selecting step selects said one radio channel from a plurality of downlink radio channels.

7. The method of claim 6, further comprising the steps of:

judging at the mobile station whether a receiving quality of a received downlink radio channel satisfies the prescribed reference quality or not at the prescribed transmission power control interval; and transmitting from the mobile station through an uplink radio channel a transmission power control information at the prescribed transmission power control interval, wherein the transmission power control information commands a lowering of a downward transmission power when the receiving quality of the received downlink radio channel is judged as satisfying the prescribed reference quality or a raising of the downward transmission power when the receiving quality of the received downlink radio channel is judged as not satisfying the prescribed reference quality;

and wherein at the selecting step, the mobile station receives a plurality of downlink radio channels from said plurality of base stations, and selects a downlink radio channel which has a best receiving quality immediately before a current unit of selective combination as the reference radio channel for the current unit of selective combination; and at the carrying out step, the mobile station transmits an identical transmission power control information to all of said plurality of base stations at the prescribed transmission power control interval according to a receiving quality of the reference radio channel for the current unit of selective combination, and each base station carries out the transmission power control during the current unit of selective combination by lowering or raising the downward transmission power at the prescribed transmission power control interval according to the identical transmission power control information transmitted from the mobile station.

8. The method of claim 1, further comprising the steps of:

transmitting from the mobile station an uplink radio channel containing a reference radio channel specifying information for specifying the reference radio channel for each unit of selective combination;

judging at each base station whether the reference radio channel for a current unit of selective combination specified by the reference radio channel specifying information is a radio channel of said each base station or not; and transmitting transmission data contained within the current unit of selective combination from said each base station to the combining station via a wire transmission line when the reference radio channel for the current unit of selective combination is a radio channel of said each base station.

9. The method of claim 8, wherein said each base station does not transmit the transmission data contained within the current unit of selective combination to the combining station via the wire transmission line when the reference radio channel for the current unit of selective combination is not a radio channel of said each base station.

10. The method of claim 8, wherein said each base station does not transmit the transmission data contained within the current unit of selective combination to the combining station via the wire transmission line when a state in which the reference radio channel for the current unit of selective combination is not a radio channel of said each base station is consecutively encountered for a prescribed number of times.

11. A CDMA mobile communication system comprising a mobile station, a plurality of base stations, and a combining station, where the mobile station during a soft handover is simultaneously connected with a plurality of base stations via a plurality of radio channels while said plurality of base stations are connected with a combining station via a plurality of wire transmission lines so that a plurality of transmission signals from said plurality of base stations to the combining station are selectively combined at a prescribed selective combination interval by the combining station and a plurality of transmission signals from said plurality of base stations to the mobile station are selectively combined at the prescribed selective combination interval by the mobile station, wherein the mobile station includes:

a selection unit for selecting one radio channel among said plurality of radio channels as a reference radio channel at the prescribed selective combination interval; and a control unit for carrying out a transmission power control at a prescribed transmission power control interval so that a receiving quality of the reference radio channel satisfies a prescribed reference quality, while not switching the reference radio channel within the prescribed selective combination interval.

12. The system of claim 11, wherein the selection unit selects a radio channel which has a best receiving quality immediately before each unit of selective combination as the reference radio channel for said each unit of selective combination.

13. The system of claim 11, wherein the selection unit selects said one radio channel from a plurality of uplink radio channels.

14. The system of claim 13, wherein each base station includes:

a unit for judging whether a receiving quality of a received uplink radio channel satisfies the prescribed reference quality or not at the prescribed transmission power control interval; and a unit for transmitting through a downlink radio channel a transmission power control information at the prescribed transmission power control interval, wherein the transmission power control information commands a lowering of an upward transmission power when the receiving quality of the received uplink radio channel is judged as satisfying the prescribed reference quality or a raising of the upward transmission power when the receiving quality of the received uplink radio channel is judged as not satisfying the prescribed reference quality;

and wherein the selection unit of the mobile station receives a plurality of transmission power control informations from said plurality of base stations, and selects an uplink radio channel received by one base station that is transmitting the transmission power control information which is continually commanding a lowering of the upward transmission power for a longest period of time prior to the transmission power control information immediately before a current unit of selective combination as the reference radio channel for the current unit of selective combination; and the control unit of the mobile station carries out the transmission power control during the current unit of selective combination by lowering or raising the upward transmission power at the prescribed transmission power control interval according to the transmission power control information transmitted from said one base station that is receiving the reference radio channel for the current unit of selective combination.

15. The system of claim 13, wherein each base station includes:

a unit for measuring a receiving quality of a received uplink radio channel immediately before each unit of selective combination; and a unit for transmitting to the mobile station a transmission power control information and an information on a measured receiving quality;

and wherein the selection unit of the mobile station selects an uplink radio channel which has a best receiving quality according to said information on a measured receiving quality for a plurality of uplink radio channels as the reference radio channel for a current unit of selective combination; and the control unit of the mobile station carries out the transmission power control during the current unit of selective combination by lowering or raising the upward transmission power at the prescribed transmission power control interval according to the transmission power control information transmitted from one base station that is receiving the reference radio channel for the current unit of selective combination.

16. The system of claim 11, wherein the selection unit selects said one radio channel from a plurality of downlink radio channels.

17. The system of claim 16, wherein the mobile station further includes:

a unit for judging whether a receiving quality of a received downlink radio channel satisfies the prescribed reference quality or not at the prescribed transmission power control interval; and a unit for transmitting through an uplink radio channel a transmission power control information at the prescribed transmission power control interval, wherein the transmission power control information commands a lowering of a downward transmission power when the receiving quality of the received downlink radio channel is judged as satisfying the prescribed reference quality or a raising of the downward transmission power when the receiving quality of the received downlink radio channel is judged as not satisfying the prescribed reference quality;

and wherein the selection unit of the mobile station receives a plurality of downlink radio channels from said plurality of base stations, and selects a downlink radio channel which has a best receiving quality immediately before a current unit of selective combination as the reference radio channel for the current unit of selective combination; and the control unit of the mobile station transmits an identical transmission power control information to all of said plurality of base stations at the prescribed transmission power control interval according to a receiving quality of the reference radio channel for the current unit of selective combination, so that each base station actually carries out the transmission power control during the current unit of selective combination by lowering or raising the downward transmission power at the prescribed transmission power control interval according to the identical transmission power control information transmitted from the mobile station.

18. The system of claim 11, wherein the mobile station further includes:

a unit for transmitting an uplink radio channel containing a reference radio channel specifying information for specifying the reference radio channel for each unit of selective combination;

and wherein each base station includes:

a unit for judging whether the reference radio channel for a current unit of selective combination specified by the reference radio channel specifying information is a radio channel of said each base station or not; and a unit for transmitting transmission data contained within the current unit of selective combination to the combining station via a wire transmission line when the reference radio channel for the current unit of selective combination is a radio channel of said each base station.

19. The system of claim 18, wherein said each base station does not transmit the transmission data contained within the current unit of selective combination to the combining station via the wire transmission line when the reference radio channel for the current unit of selective combination is not a radio channel of said each base station.

20. The system of claim 18, wherein said each base station does not transmit the transmission data contained within the current unit of selective combination to the combining station via the wire transmission line when a state in which the reference radio channel for the current unit of selective combination is not a radio channel of said each base station is consecutively encountered for a prescribed number of times.

21. A mobile station apparatus for a CDMA mobile communication system comprising a mobile station, a plurality of base stations, and a combining station, where the mobile station during a soft handover is simultaneously connected with a plurality of base stations via a plurality of radio channels while said plurality of base stations are connected with a combining station via a plurality of wire transmission lines so that a plurality of transmission signals from said plurality of base stations to the combining station are selectively combined at a prescribed selective combination interval by the combining station and a plurality of transmission signals from said plurality of base stations to the mobile station are selectively combined at the prescribed selective combination interval by the mobile station, the mobile station apparatus comprising:

a selection unit for selecting one radio channel among a plurality of uplink radio channels as a reference radio channel at the prescribed selective combination interval; and a control unit for carrying out a transmission power control at a prescribed transmission power control interval so that a receiving quality of the reference radio channel satisfies a prescribed reference quality, while not switching the reference radio channel within the prescribed selective combination interval;

wherein each base station judges whether a receiving quality of a received uplink radio channel satisfies the prescribed reference quality or not at the prescribed transmission power control interval, and transmits through a downlink radio channel a transmission power control information at the prescribed transmission power control interval, the transmission power control information being commanding a lowering of an upward transmission power when the receiving quality of the received uplink radio channel is judged as satisfying the prescribed reference quality or a raising of the upward transmission power when the receiving quality of the received uplink radio channel is judged as not satisfying the prescribed reference quality;

the selection unit receives a plurality of transmission power control informations from said plurality of base stations, and selects an uplink radio channel received by one base station that is transmitting the transmission power control information which is continually commanding a lowering of the upward transmission power for a longest period of time prior to the transmission power control information immediately before a current unit of selective combination as the reference radio channel for the current unit of selective combination; and the control unit carries out the transmission power control during the current unit of selective combination by lowering or raising the upward transmission power at the prescribed transmission power control interval according to the transmission power control information transmitted from said one base station that is receiving the reference radio channel for the current unit of selective combination.

22. A mobile station apparatus for a CDMA mobile communication system comprising a mobile station, a plurality of base stations, and a combining station, where the mobile station during a soft handover is simultaneously connected with a plurality of base stations via a plurality of radio channels while said plurality of base stations are connected with a combining station via a plurality of wire transmission lines so that a plurality of transmission signals from said plurality of base stations to the combining station are selectively combined at a prescribed selective combination interval by the combining station and a plurality of transmission signals from said plurality of base stations to the mobile station are selectively combined at the prescribed selective combination interval by the mobile station, the mobile station apparatus comprising:

- a selection unit for selecting one radio channel among a plurality of downlink radio channels as a reference radio channel at the prescribed selective combination interval;
- a control unit for carrying out a transmission power control at a prescribed transmission power control interval so that a receiving quality of the reference radio channel satisfies a prescribed reference quality, while not switching the reference radio channel within the prescribed selective combination interval;
- a judgement unit for judging whether a receiving quality of a received downlink radio channel satisfies the prescribed reference quality or not at the prescribed transmission power control interval; and
- a transmission unit for transmitting through an uplink radio channel a transmission power control information at the prescribed transmission power control interval, the transmission power control information being commanding a lowering of a downward transmission power when the receiving quality of the received downlink radio channel is judged as satisfying the prescribed reference quality or a raising of the downward transmission power when the receiving quality of the received downlink radio channel is judged as not satisfying the prescribed reference quality;

wherein the selection unit receives a plurality of downlink radio channels from said plurality of base stations, and selects a downlink radio channel which has a best receiving quality immediately before a current unit of selective combination as the reference radio channel for the current unit of selective combination; and the control unit transmits an identical transmission power control information to all of said plurality of base stations at the prescribed transmission power control interval according to a receiving quality of the reference radio channel for the current unit of selective combination, so that each base station actually carries out the transmission power control during the current unit of selective combination by lowering or raising the downward transmission power at the prescribed transmission power control interval according to the identical transmission power control information transmitted from the mobile station.

* * * * *